Dec. 15, 1942.    J. A. CARPENTER    2,305,237
AIRPLANE LANDING WHEEL
Filed Dec. 7, 1939
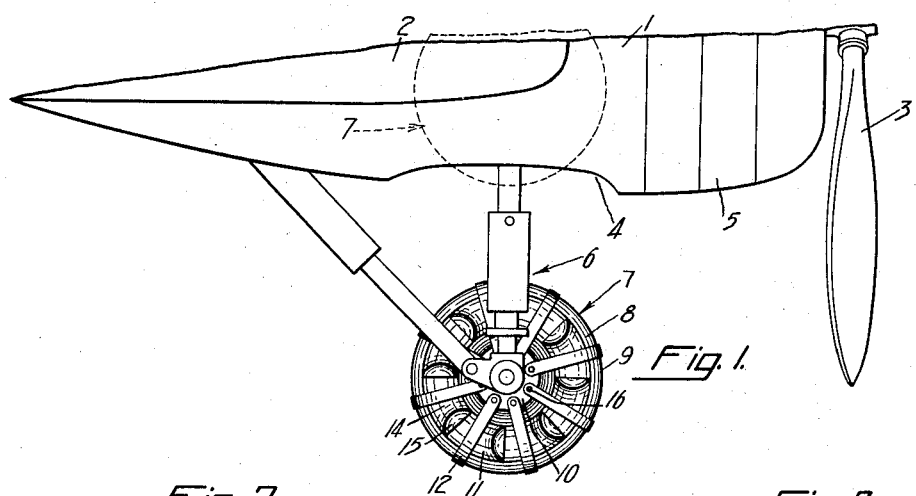
Fig. 1.
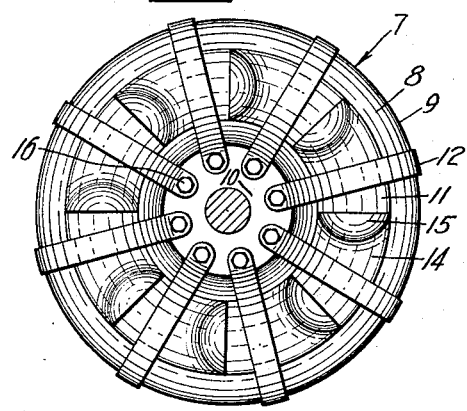
Fig. 2.
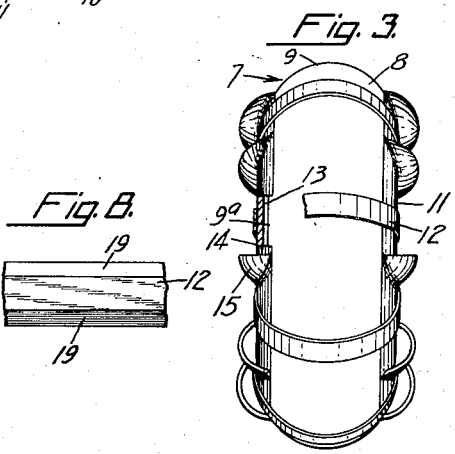
Fig. 3.
Fig. 8.
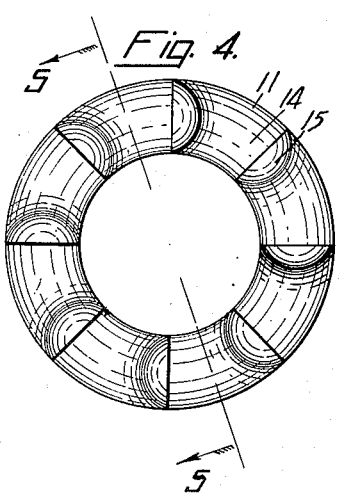
Fig. 4.
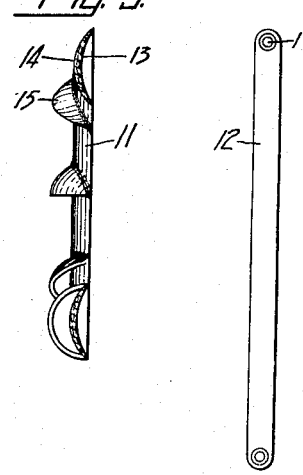
Fig. 5.
Fig. 6.
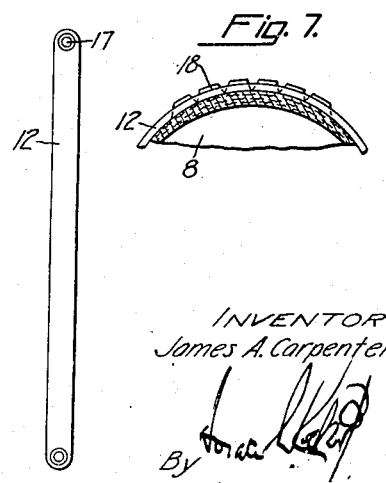
Fig. 7.
INVENTOR
James A. Carpenter
By
ATTORNEY Patented Dec. 15, 1942

2,305,237

UNITED STATES PATENT OFFICE 2,305,237

AIRPLANE LANDING WHEEL

James A. Carpenter, Hartford, Conn.

Application December 7, 1939, Serial No. 308,051

11 Claims. (Cl. 244—103)

My invention relates to airplane landing wheels.

It has among its objects to provide an improved airplane landing wheel whereby it is made possible very substantially to reduce the wear on the tires incident to landing, and correspondingly prolong the life of the large and expensive tires required for this service in such manner as markedly to reduce the necessary expense for tire upkeep. A further object of my invention is to provide such an improved construction wherein, while the landing wheels are caused to be rotated by the air stream as the plane approaches the ground, in such manner as to eliminate the violent scrubbing wear now usual during landing, it is made possible to enable standard tires to be used, as distinguished from special tires having vanes molded in the sides thereof and hence of prohibitively expensive construction. A still further object of my invention is to provide such an improved construction wherein it is made possible to impart the desired forward rotation to the wheels at the desired speed during landing, through the use of improved wheel rotating elements cooperating with the tire in an improved manner and connected thereto by improved means. Other objects of my invention are to produce such an improved construction wherein my improved wheel rotating elements are readily applied to the wheels and connected thereto by improved inexpensive connecting means and wherein the wear largely comes upon these inexpensive connecting elements in such manner that while these connecting elements may be quickly and economically replaced, both the tire rotating means and the tire may continue in service for longer periods. These and other advantages of my improvements will, however, hereinafter more fully appear.

In the accompanying drawing, I have shown for purposes of illustration, one embodiment which my invention may assume in practice.

In this drawing:

Figure 1 is a side elevation of a plane equipped with my improvements, portions of the plane being broken away to facilitate illustration;

Fig. 2 is an enlarged side elevation of one of the landing wheels removed from the plane;

Fig. 3 is an end view of the wheel shown in Figure 2;

Fig. 4 is a side elevation of one of the wheel rotating members removed from the wheel;

Fig. 5 is a sectional view on line 5—5 of Figure 4;

Fig. 6 is a plan view of one of the strap members;

Fig. 7 is a detail view of a modified construction, and

Fig. 8 is a detail view of a modified form of strap.

In this illustrative construction, I have shown my invention adapted to use in connection with a plane of standard construction and having a fuselage 1, wings 2, and propeller 3, and also having an opening 4 in the nacelle in rear of the motor housing 5 and adapted to receive and house during flight the landing gear 6 including my improved landing wheels, generally indicated at 7; this landing gear being adapted to be lowered in a well known manner as the plane approaches a landing, from the dotted line position of the wheels 7 shown in Figure 1, to the full line position shown therein.

Referring more particularly to the wheel structure, it will be observed that herein I utilize a usual large low pressure tire 8 which may be of any standard construction and have any suitable tread 9 thereon, most frequently a smooth tread, while also having the smooth sides 9a now standard in such tires. Further, this tire 8 is carried on a usual wheel or hub 10 to which the tire is connected in a usual manner. However, in my improved construction, I provide improved wheel rotating members 11 enclosing the opposite sides of the tires 8 and also connect these members 11 to the wheels 10 by improved strap members 12, in such manner that the air stream acting on the members 11 imparts the desired forward rotation to the wheels as soon as the landing gear is lowered from its dotted line flight position shown in Figure 1 to its full line landing position also shown in that figure.

Referring more particularly to the wheel rotating members 11, it will be noted that the same are annular and of such dimensions, as shown in Figure 4, as to enclose the side walls of the tire 8 with their outer peripheries terminating short of the tread 9 and their inner peripheries terminating short of the wheel 10. As shown, they are also provided with concave inner faces 13 adapted to enclose the rounded side walls 9a of the tire 8, although preferably of somewhat less curvature than these side walls. Also, the outer faces of these members 11 are preferably convex, as shown at 14. Further, it will be observed that these members 11 carry on their outer convex faces at equally spaced points around the same, projecting vanes or curved cups 15 all disposed in the same direction and each adapted, when at the bottom of the wheel, to receive the full impact of the moving air stream flowing by the tire. Herein, eight such vanes or cups 15 are provided equally spaced around each member 11, although obviously the number of such cups may be varied as desired, as may also the conformation of the same. Attention is further directed to the fact that these members 11 are of light yet strong construction and somewhat resilient so that, without clinging too tightly, they may conform generally to and expand or contract laterally with the walls of the tire and continue to conform generally thereto when the tread of the latter is compressed or flattened upon contact with the ground or the tire is returned to normal conformation when in flight. While the construction of these members 11 may vary, they preferably correspond generally in their internal construction to the tread portion of a tire, as regards general carcass structure and reinforcement, in such manner as to give both the desired strength and resiliency. The projecting vanes or cups 15 are preferably also molded thereon, with or without suitable internal reinforcement and connection to the carcass of the members 11, but it will be understood that these members 15 are of such construction and conformation as not to interfere with the desired resiliency of the members 11 referred to above. It will also be understood that the outer peripheries of the members 11 are preferably suitably reinforced in such manner as thereby to increase the wearing qualities of this portion of these members which, during landing, i. e. when the tire 8 is flattened or compressed, may also come into frictional engagement with the ground.

Cooperating with these improved wheel rotating members 11 are also my improved strap members 12. As shown, these members are suitably connected at their opposite ends to the wheel 10, as by a suitable removable bolt connection 16 on each side of the wheel. Further, it will be observed that each of these members extends from one of its connections 16 along the side of the tire and over the convex face 14 of the adjacent member 11 and between adjacent cup members 15 thereon, and then across the tread 9 of the tire and down over the outer wall 14 of the other member 11 and between adjacent cup members 15 thereon to the other connection 16. Further, while the number of these members 12 may be varied, it will be observed that as herein I preferably provide as many of these strap members 12 as there are cups 15, and extend these strap members between each adjacent pair of cups, in such manner as thereby very securely to connect the members 11 to the tire 8 and wheel 10. Here attention is also directed to the fact that these members 12 are also somewhat resilient and suitably internally reinforced, in such manner that, while they also are capable of conforming to the changes in conformation of the tire and members 11 during landing, they have sufficient strength to withstand the strains incident to such sudden and sometimes extreme changes in shape of the tire as are experienced in landing, as well as the repeated scuffing actions incident to landing. Attention here is further directed to the fact that these strap members 12 are also preferably provided with suitably inserted eyelets or other connecting means 17 at their ends adapting them to be securely clamped by their connections 16.

In the use of my improved construction, it is made possible to apply my improved tire rotating members 11 very quickly and readily to a standard wheel, it only being necessary to lay the members 11 upon the sides thereof and attach the straps 12 to the wheel or hub portions 10 in the manner indicated. Further, when so equipped, the air stream will begin to rotate such a wheel as soon as the braking mechanism is released as a preliminary to lowering the landing gear, while by the time the landing gear is completely lowered, the wheels are rotating at a substantial speed. Thus, it is made possible for the severe scrubbing wear incident to landing and heretofore unavoidable while utilizing a standard tire, to be substantially reduced. Moreover, it will be observed that most of the remaining wear comes upon the cross straps 12 which overlie the tread of the tire, while some wear also is taken upon the outer periphery of the members 11, all in such manner as thereby further to reduce the wear upon the tire 8. It will also be apparent that the straps 12 are of such character that they may be very inexpensively replaced, while it further will be evident that the members 11 may also be replaced at a fraction of the cost of a new tire. Ordinarily, however, while the straps 12 may require frequent replacement, the members 11 may be used over long periods.

In Figure 7, I have shown a modified construction which, while not preferred, may be used if desired. In this construction, the tire 8 is of special construction only as regards the provision of transverse slots 18 in its tread adapted to receive the straps 12. Thus, it will be apparent that the straps will be protected by their location in these transverse slots, in such manner as to minimize wear thereon. Further, it will be apparent that in this construction the remainder of the tread 9 of the tire may be of any desired non-skid construction without in any way interfering with the use of the straps. In Figure 8, the straps 12 are shown provided with beveled edges 19 which may be used if desired.

As a result of my improvements, it is made possible very materially to increase the life of an airplane tire and effect substantial savings in tire upkeep, as will be apparent when it is considered that a tire costing several hundred dollars is at present not considered safe after being used for more than one hundred landings. Further, at the same time that the now usual burning and smoking of the tires is overcome, it is made possible to continue to use standard tires, while obtaining the rotation of the wheels heretofore only obtainable by special tires which are so prohibitively expensive as to be wholly impractical. In addition, through the use of my improved construction, it is further made possible not only to obtain the desired forward rotation of the tire in such manner as to minimize scrubbing during landing, but further possible to transfer a substantial part of the remaining wear incident to landing, to relatively inexpensive replaceable parts, as distinguished from having this wear come upon the tire proper. It will further be evident that when the tire tread is flattened upon contact with the ground, both the transverse straps 12 and the outer peripheries of the portions 11 will also act somewhat to increase the frictional contact with the ground and thus further to reduce the speed of the plane during landing. It will also be observed that the members 11 further act as protective means for the at present relatively light and unprotected sides of the balloon type tires now in use. Attention is also directed to the fact that both the members 11 and the straps 12 are of a character adapted to be manufactured by any tire maker at small expense. These and other advantages of my improved construction will, however, be apparent to those skilled in the art.

While I have herein specifically described two forms which my invention may assume in practice, it will be understood that these have been shown for purposes of illustration, and that the invention may be modified and embodied in other forms without departing from its spirit or the scope of the appended claims.

What I claim as new and desire to secure by Letters Patent is:

1. A landing wheel for airplanes having a wheel member, a tire thereon, vane carrying means separate from said tire engaging a side wall thereof and exposing substantially the entire tread of said tire, a plurality of wheel rotating vanes fixed to said vane carrying means and disposed opposite said side wall in spaced relation around said side wall of said tire, and means for releasably connecting said vane carrying means to said wheel member.

2. A landing wheel for airplanes having a wheel member, a tire thereon, flexible vane carrying means at one side of and exposing the tire tread and adapted to conform to tire flexures and separate from said tire and engaging a side wall thereof, wheel rotating vanes fixed to said means and disposed in spaced relation around and projecting laterally from said side wall of said tire, and means for releasably connecting said vane carrying means to said wheel member.

3. A landing wheel for airplanes having a wheel member, a tire thereon, vane carrying means exposing the tire tread and separate from said tire engaging a side wall thereof, wheel rotating vanes fixed to said means and spaced from one another thereon and along said side wall, and means for releasably connecting said vane carrying means to said wheel member including transverse connections extending across the tire tread and connected to said wheel member.

4. An airplane landing wheel comprising a wheel member, a tire thereon, an annular member at one side of and exposing the tire tread and separate from said tire and having one side thereof extending around and projecting laterally from one of the side walls of said tire and spaced wheel rotating vanes fixed to the opposite face of said annular member, and means for attaching said annular member for rotation with said wheel member.

5. An airplane landing wheel comprising a wheel member, a tire thereon, annular resilient members exposing the tire tread therebetween and enclosing and engaging the opposite side walls of said tire and separate therefrom and adapted to conform to tire flexures, spaced wheel rotating vanes fixed to the outer faces of said members, and means detachably connected to said wheel member for pressing said annular members against opposite side walls of said tire.

6. An airplane landing wheel comprising a wheel member, a tire thereon, a flexible member exposing the tire tread and engaging one side wall of said tire and adapted to conform to tire flexures and carrying spaced vanes on the outer face of said member, and strap members connected at opposite ends to said wheel member and extending transversely of said side wall engaging member between adjacent vanes and over said flexible member and across the tread of the tire.

7. A tire side wall enclosing member for attachment to an airplane tire when in use to impart rotation thereto during landing, having an annular body portion disposed at one side of the tire tread to expose the latter, and having one face of said portion adapted to enclose and engage a side wall of the tire and also having laterally projecting vane members spaced along the outer face of said portion.

8. A tire side wall enclosing member for attachment to an airplane tire when in use to impart rotation thereto during landing having an annular resilient body portion adapted to conform generally to the flexures of the side wall of the tire during use of the latter and at one side of and exposing the tire tread and having an annular recess in one face to receive and engage a side wall of the tire and also having laterally projecting vane members spaced along the outer face of said portion.

9. An airplane landing wheel including a wheel member, a tire thereon, having a tread, a side wall enclosing member for said tire having an annular body portion exposing the tire tread and having one face annularly recessed to enclose a side wall of the tire, and also having laterally projecting vane members spaced along the outer face of said member, the outer periphery of said member extending to adjacent the outer edge of said tread to expose the latter and also being engageable frictionally with the ground during landing to increase the area in contact with the ground, and means for releasably connecting said enclosing member to said wheel.

10. An airplane landing wheel including a wheel member, a tire thereon having a tread and transverse passage means in the latter, vane carrying means separate from said tire and having wheel rotating vanes spaced around a side wall of said tire, and connecting means for securing said vane carrying means in operative position including straps having intermediate portions disposed in said passage means and passing over said vane carrying means and also having end portions releasably connected to said wheel member.

11. An airplane wheel including a wheel member, a tire thereon having a tread and transverse passage means in the latter, annular members enclosing the opposite sides of said tire and carrying spaced wheel rotating vanes, and means for connecting said annular members to said wheel member including connecting straps disposed in said passage means and passing over said tire and connected to said wheel member.

JAMES A. CARPENTER.